US011219332B2

(12) United States Patent
Nishikawa et al.

(10) Patent No.: US 11,219,332 B2
(45) Date of Patent: Jan. 11, 2022

(54) BEVERAGE EXTRACTION DEVICE

(71) Applicant: FUJI ELECTRIC CO., LTD., Kawasaki (JP)

(72) Inventors: Yohei Nishikawa, Yokkaichi (JP); Hajime Erikawa, Kumagaya (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 307 days.

(21) Appl. No.: 16/284,521

(22) Filed: Feb. 25, 2019

(65) Prior Publication Data

US 2019/0183284 A1 Jun. 20, 2019

Related U.S. Application Data

(63) Continuation of application No. PCT/JP2017/024306, filed on Jul. 3, 2017.

(30) Foreign Application Priority Data

Sep. 1, 2016 (JP) .............................. JP2016-170908

(51) Int. Cl.
*A47J 31/60* (2006.01)
*A47J 31/18* (2006.01)
*B08B 3/12* (2006.01)

(52) U.S. Cl.
CPC ............... *A47J 31/60* (2013.01); *A47J 31/18* (2013.01); *B08B 3/12* (2013.01)

(58) Field of Classification Search
CPC .............. A47J 31/18; A47J 31/60; B08B 3/12
See application file for complete search history.

(56) References Cited

U.S. PATENT DOCUMENTS 3,824,913 A * 7/1974 Herman .............. A47J 31/3619
99/298
10,314,426 B2 6/2019 Hulett et al.
(Continued)

FOREIGN PATENT DOCUMENTS

CN 201579016 U 9/2010
CN 201898195 U 7/2011
(Continued)

OTHER PUBLICATIONS

China Patent Office, "Office Action for Chinese Patent Application No. 201780053366.7," dated Jul. 3, 2020.
(Continued)

*Primary Examiner* — Erin E McGrath
(74) *Attorney, Agent, or Firm* — Manabu Kanesaka

(57) ABSTRACT

A beverage extraction device includes: a cylinder, having a bottomed cylindrical shape, having a lower-surface opening which is closed with a bottom portion; a mesh member, having a disk shape, having a plurality of through holes, moving close to and away from the bottom portion to extract beverage from beverage raw material and hot water, fed through an upper-surface opening of the cylinder, so that the extracted beverage is discharged through an extraction passage connected to the bottom portion; an ultrasonic vibrator provided on the bottom portion; and a control unit, when a cleaning instruction is given, driving the ultrasonic vibrator in a state where the hot water is stored in the cylinder to apply ultrasonic waves to the hot water, and causing the mesh member to move close to and away from the bottom portion.

4 Claims, 10 Drawing Sheets

(56) References Cited

U.S. PATENT DOCUMENTS

| | | | |
|---|---|---|---|
| 2007/0068393 A1 | 3/2007 | Nosler et al. | |
| 2008/0032030 A1* | 2/2008 | Babaev | A47J 31/002 426/594 |
| 2008/0202346 A1* | 8/2008 | Accumanno | A47J 31/0615 99/280 |
| 2008/0241322 A1* | 10/2008 | Bunge | A47J 31/002 426/238 |
| 2009/0004351 A1* | 1/2009 | Maurer | A47J 31/0631 426/433 |
| 2009/0095165 A1 | 4/2009 | Nosler et al. | |
| 2010/0154645 A1 | 6/2010 | Nosler et al. | |
| 2010/0272870 A1* | 10/2010 | Hsu | A47J 31/002 426/238 |
| 2011/0088560 A1 | 4/2011 | Nosler et al. | |
| 2011/0151075 A1* | 6/2011 | Peterson | A47J 31/3623 426/238 |
| 2011/0297004 A1* | 12/2011 | Figura | A47J 31/057 99/290 |
| 2012/0156337 A1 | 6/2012 | Studor et al. | |
| 2013/0156904 A1 | 6/2013 | Nosler et al. | |
| 2014/0106042 A1 | 4/2014 | Nosler et al. | |
| 2014/0170280 A1 | 6/2014 | St. Germain et al. | |
| 2015/0107459 A1 | 4/2015 | St-Germain et al. | |
| 2015/0157039 A1 | 6/2015 | Nosler et al. | |
| 2016/0302614 A1 | 10/2016 | Fasnacht | |

FOREIGN PATENT DOCUMENTS

| | | | |
|---|---|---|---|
| CN | 202801287 U | 3/2013 | |
| CN | 103596473 A | 2/2014 | |
| CN | 104066363 A | 9/2014 | |
| CN | 105792716 A | 7/2016 | |
| JP | 2006-007104 A | 1/2006 | |
| JP | 5044558 B2 | 10/2012 | |
| JP | 2014-502751 A | 2/2014 | |
| WO | 2007/035877 A2 | 3/2007 | |
| WO | WO-2017010670 A1 * | 1/2017 | A47J 31/44 |

OTHER PUBLICATIONS

PCT/ISA/237; Written Opinion of the International Searching authority dated Oct. 3, 2017 in International (PCT) Application No. PCT/JP2017/024306.

PCT/ISA/210 & 220; International Search report dated Oct. 3, 2017 in International (PCT) Application No. PCT/JP2017/024306.

* cited by examiner

BEVERAGE EXTRACTION DEVICE

CROSS-REFERENCE TO RELATED APPLICATION(S)

The present application claims priority to and incorporates by reference the entire contents of PCT International Application No. PCT/JP2017/024306 filed on Jul. 3, 2017.

BACKGROUND

The present disclosure relates to a beverage extraction device.

In the related art, as a beverage extraction device applied to a beverage server and a cup-type automatic beverage vending machine, for example, a beverage extraction device including a cylinder and a mesh member has been known.

The cylinder is an extraction container having a bottomed cylindrical shape the lower-surface opening of which is closed with a bottom portion. The mesh member has a disk shape in which a plurality of through holes are formed, and can be vertically moved close to and away from the bottom portion with its side surface being in contact with an inner surface of the cylinder.

In such a beverage extraction device, when beverage raw material and hot water have been fed therein through an upper-surface opening of the cylinder, the mesh member is vertically moved to extract a beverage, and the extracted beverage is discharged through an extraction passage connected to the bottom portion (see Japanese Patent No. 5044558, for example).

In the beverage extraction device described above, the mesh member is movably provided inside the cylinder, and the side surface of the mesh member is in contact with the inner surface of the cylinder. This configuration makes it difficult to remove the mesh member from the cylinder. Thus, when the beverage extraction device is cleaned, cleaning of the mesh member may be insufficient.

SUMMARY

There is a need for providing a beverage extraction device that enables favorable cleaning without removing a mesh member.

According to an embodiment, a beverage extraction device includes: a cylinder having a bottomed cylindrical shape a lower-surface opening of which is closed with a bottom portion made of metal; and a mesh member having a disk shape in which a plurality of through holes are formed, the mesh member being movable close to and away from the bottom portion with its side surface being in contact with an inner surface of the cylinder. The beverage extraction device extracts beverage from beverage raw material and hot water that are fed through an upper-surface opening of the cylinder by moving the mesh member, and discharge the extracted beverage through an extraction passage connected to the bottom portion. Further, the beverage extraction device further includes: an ultrasonic vibrator provided on the bottom portion; and a control unit that, when a cleaning instruction is given, drives the ultrasonic vibrator in a state where the hot water is stored in the cylinder to apply ultrasonic waves to the hot water, and causes the mesh member to move close to and away from the bottom portion.

According to an embodiment, a beverage extraction device includes: a cylinder having a bottomed cylindrical shape a lower-surface opening of which is closed by a bottom portion made of metal; and a mesh member having a disk shape in which a plurality of through holes are formed, the mesh member being movable close to and away from the bottom portion with its side surface being in contact with an inner surface of the cylinder. The beverage extraction device extracts beverage from beverage raw material and hot water fed through an upper-surface opening of the cylinder by moving the mesh member, and discharge the extracted beverage through an extraction passage connected to the bottom portion. Further, the beverage extraction device further includes: an ultrasonic vibrator provided on the bottom portion; and a control unit that, when a cleaning instruction is given, causes the mesh member to be disposed at a predetermined cleaning position that is separated by a predetermined distance from the bottom portion in a state where the hot water is stored in the cylinder, and drives the ultrasonic vibrator to apply ultrasonic waves to the hot water.

DETAILED DESCRIPTION

A preferred embodiment of a beverage extraction device according to the present disclosure will be described in detail with reference to the accompanied drawings.

Figure 1:
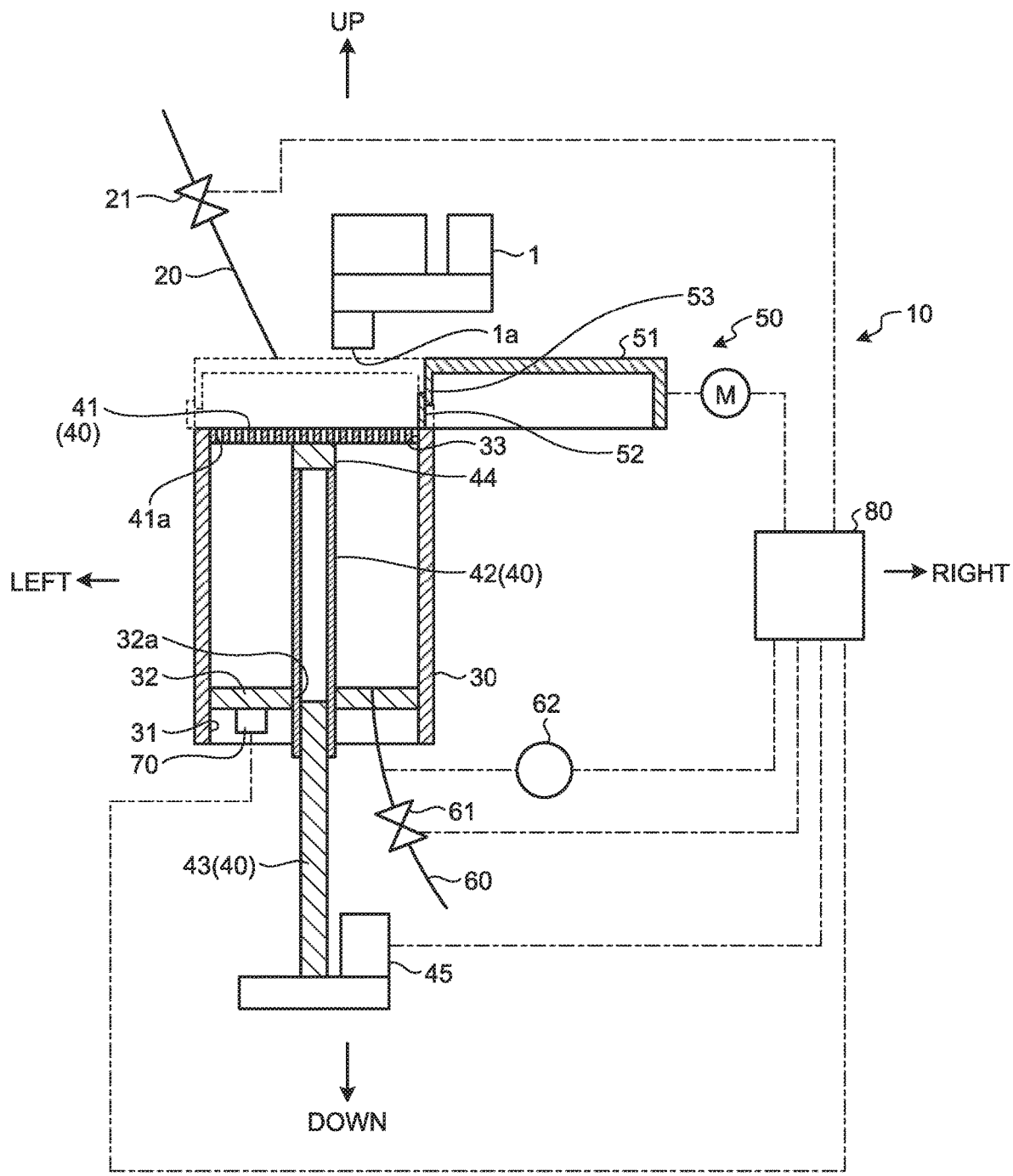
FIG. 1 is a schematic drawing schematically illustrating a beverage extraction device according to an embodiment of the present disclosure.

FIG. 1 is a schematic drawing schematically illustrating the beverage extraction device according to the embodiment of the present disclosure, in which part of the device is illustrated in cross-section.

This beverage extraction device 10 exemplified herein is a device which is applied to a beverage server and a cup-type automatic beverage vending machine, for example, that provide beverages such as coffee or tea and which extracts coffee beverage from a coffee raw material (ground beans:

beverage raw material) supplied through a supply port 1a of a mill 1 and hot water supplied through a hot-water passage 20.

The hot-water passage 20 is provided on the left side of the mill 1, and through this passage, hot water supplied from a hot-water tank (not illustrated) is passed. This hot-water passage 20 is provided with a hot-water supply valve 21. The hot-water supply valve 21 is a valve that is opened and closed in response to instructions given from a controller (control unit) 80. When the valve is opened, hot water is allowed to pass through the hot-water passage 20, and when the valve is closed, hot water is prevented from passing through the hot-water passage 20.

The beverage extraction device 10 includes a cylinder 30, a piston unit 40, a cover member 50, an extraction passage 60, and an ultrasonic vibrator 70.

The cylinder 30 is entirely made of metal, and has a bottomed cylindrical shape in which a lower-surface opening 31 formed at a lower surface thereof is closed with a bottom portion 32. The cylinder 30 is thus supported by a cylinder holder (not illustrated), and the axial direction thereof corresponds to the vertical direction.

The piston unit 40 includes a mesh member 41, a feed nut 42, and a feed screw 43. The mesh member 41 is made of metal material, for example, and has a disk shape. A side surface of this mesh member 41 is in contact with an inner surface of the cylinder 30, and a plurality of through holes 41a are formed in the mesh member so as to vertically penetrate.

The feed nut 42 is an elongated member, the longitudinal direction of which corresponds to the vertical direction, and is attached to a central portion of the lower surface of the mesh member 41 with an attachment block 44 interposed therebetween. This feed nut 42 has a cylindrical shape, an opening of which at its upper surface is closed with the attachment block 44, and penetrates through a nut hole 32a formed in a central portion of the bottom portion 32. The outside diameter of this feed nut 42 is slightly smaller than the inside diameter of the nut hole 32a, and airtightness and water-tightness are achieved by providing packing, for example, in a clearance between the feed nut 42 and the nut hole 32a.

The feed screw 43 is an elongated member the longitudinal direction of which corresponds to the vertical direction, and part thereof has been inserted into the feed nut 42. The outside surface of this feed screw 43 to be inserted into the feed nut 42 is screwed with the inside surface of the feed nut 42. A lower end portion of the feed screw 43 is connected to a piston motor 45. The piston motor 45 is driven so as to be rotatable in normal and reverse rotation directions in response to instructions given from the controller 80.

Thus, when the piston motor 45 is driven in the normal rotation direction, the feed screw 43 is rotated clockwise about its axis when viewed from above, for example, whereby the feed nut 42 screwed with the feed screw is moved downward. When the piston motor 45 is driven in the reverse rotation direction, the feed screw is rotated counterclockwise about the axis when viewed from above, for example, whereby the feed nut 42 is moved upward.

The feed nut 42 is moved along the vertical direction by the rotation of the feed screw 43 in this manner, whereby the mesh member 41 to which the feed nut 42 is attached with the attachment block 44 interposed therebetween can be moved close to and away from the bottom portion 32 with the side surface of the mesh member being in contact with the inner surface of the cylinder 30.

The cover member 50 is provided in an area above the cylinder 30. This cover member 50 has a box shape a lower wall portion of which is open, and an upper wall portion 51 thereof has a sufficient size for covering an upper-surface opening 33 of the cylinder 30.

The cover member 50 is thus connected to a cover motor M. The cover motor M is driven so as to be rotatable in the normal and reverse rotation directions in response to instructions given from the controller 80.

When the cover motor M is driven in the normal rotation direction, the cover member 50 is moved rightward to a fully opened position where the upper-surface opening 33 of the cylinder 30 is fully opened as indicated by continuous lines in FIG. 1. When the cover motor M is driven in the reverse rotation direction, the cover member is moved leftward to a fully closed position where the upper-surface opening 33 of the cylinder 30 is fully closed as indicated by the dashed lines in FIG. 1. In other words, the cover member 50 is provided so as to be movable between the fully closed position where the upper-surface opening 33 is fully closed and the fully opened position where the upper-surface opening 33 is fully opened. Although details will be described later, the cover member 50 is also moved to a midway position (third position) where the upper-surface opening 33 is partially closed between the fully opened position and the fully closed position.

The cover member 50 includes a scraper portion 52. The scraper portion 52 is attached to a left wall portion 53 of the cover member 50. The vertical length of this scraper portion 52 is determined such that the lower end portion thereof comes into sliding contact with the upper surface of the cylinder 30 when the cover member 50 is moved between the fully opened position and the fully closed position.

The extraction passage 60 is connected to the bottom portion 32 so as to penetrate through an extraction hole (not illustrated) formed in the bottom portion 32. This extraction passage 60 allows a coffee beverage extracted inside the cylinder 30 to pass therethrough to be discharged into a beverage container C (see FIG. 8). This extraction passage 60 is provided with an extraction valve 61 and a pressure sensor 62.

The extraction valve 61 is a valve that is opened and closed in response to instructions given from the controller 80. The extraction valve allows a coffee beverage to pass through the extraction passage 60 when opened, and stops the coffee beverage from passing through the extraction passage 60 when closed.

The pressure sensor 62 is provided on the upstream side of the extraction valve 61. This pressure sensor 62 detects a pressure in the cylinder 30 at an area lower than the mesh member 41. This pressure sensor 62 gives a detected pressure as a pressure signal to the controller 80.

The ultrasonic vibrator 70 is attached to the bottom portion 32 of the cylinder 30. The ultrasonic vibrator 70 is driven in response to instructions given from the controller 80, and applies ultrasonic waves to hot water stored in the cylinder 30 when being driven.

Figure 2:
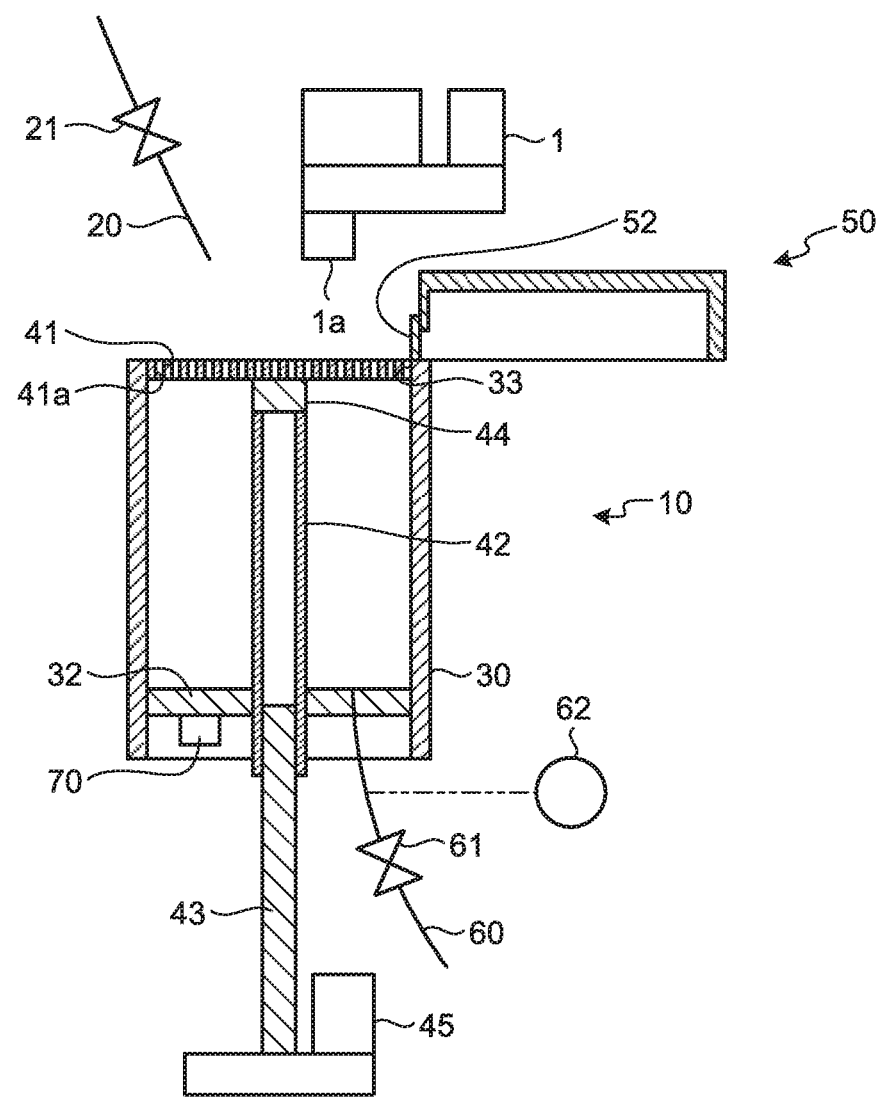
FIG. 2 is an explanatory drawing illustrating a procedure of beverage extracting operation of the beverage extraction device illustrated in FIG. 1.

The following describes an extracting operation of the beverage extraction device 10 having the above-described structure. In a standby state, as illustrated in FIG. 2, the mesh member 41 is disposed at a top dead point in the same level as the upper surface of the cylinder 30, whereby the upper-surface opening 33 is closed, and the cover member 50 is disposed at the fully opened position. The hot-water supply valve 21 and the extraction valve 61 are both closed.

In this standby state, when a start instruction is given, the controller 80 gives a drive instruction to the piston motor 45 to drive the piston motor 45 in the normal rotation direction. Accordingly, the feed screw 43 is rotated clockwise when viewed from above, whereby the mesh member 41 is moved downward together with the feed nut 42.

Figure 3:
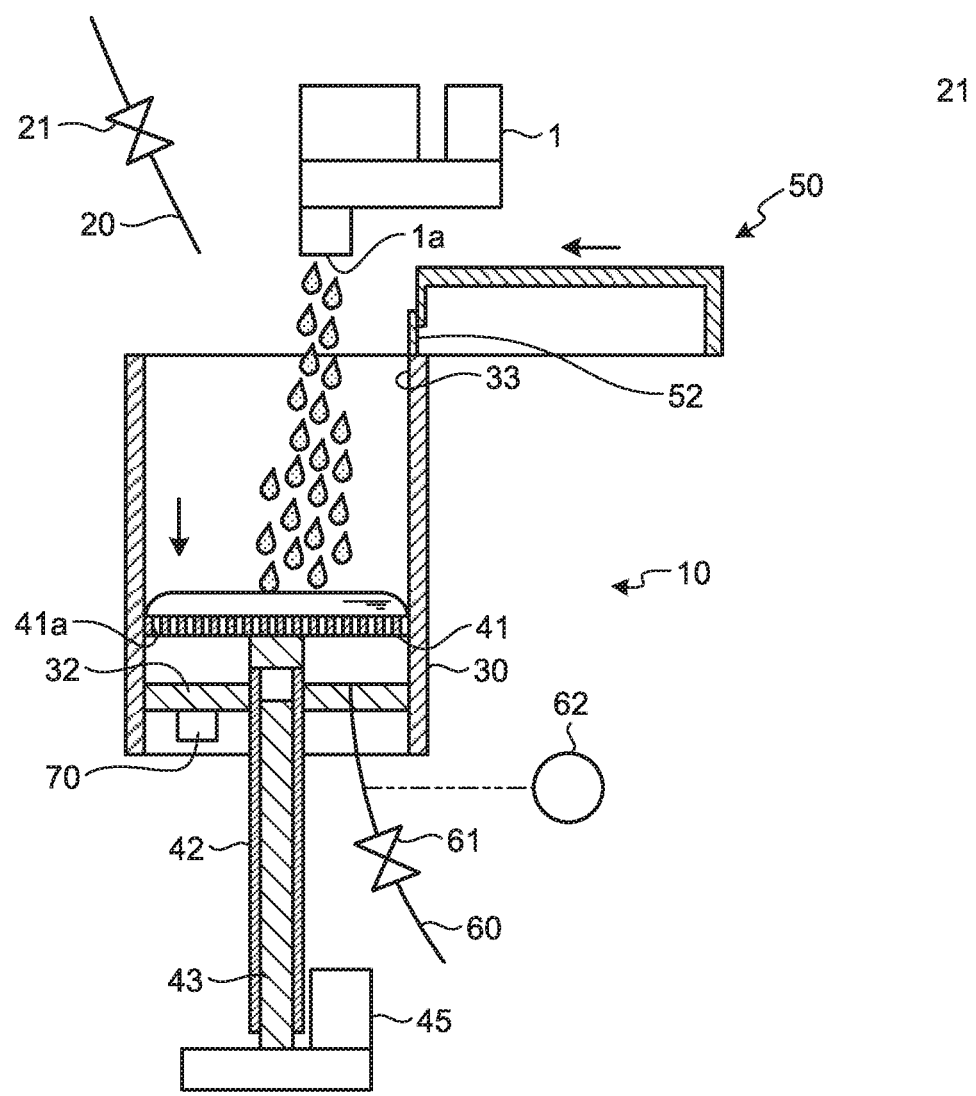
FIG. 3 is another explanatory drawing illustrating the procedure of the beverage extracting operation of the beverage extraction device illustrated in FIG. 1.

Subsequently, when the mesh member 41 has been moved to a bottom dead point where the mesh member is closest to the bottom portion 32, the controller 80 gives a drive stop instruction to the piston motor 45. Consequently, the mesh member 41 is disposed at the bottom dead point as illustrated in FIG. 3.

When coffee raw material is fed into the cylinder 30 from the mill 1, the coffee raw material is accumulated on the upper surface of the mesh member 41. When the feeding of the coffee raw material from the mill 1 has been completed, the controller 80 gives a drive instruction to the cover motor M to drive the cover motor M in the reverse rotation direction. Accordingly, the cover member 50 is moved leftward from the fully opened position.

Figure 4:
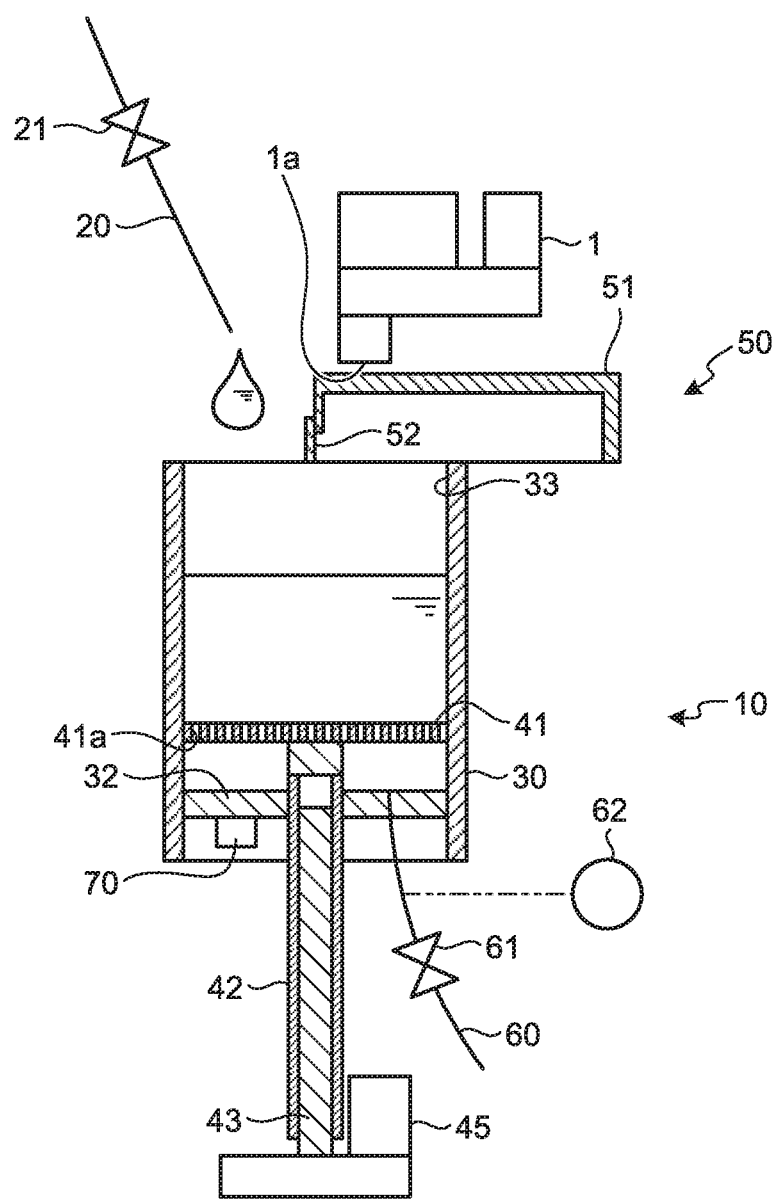
FIG. 4 is another explanatory drawing illustrating the procedure of the beverage extracting operation of the beverage extraction device illustrated in FIG. 1.

Subsequently, when the cover member 50 has been moved to the midway position where the upper-surface opening 33 is partially closed, the controller 80 gives a drive stop instruction to the cover motor M. Consequently, the cover member 50 is disposed at the midway position as illustrated in FIG. 4. In this case, the cover member 50 closes the supply port 1a of the mill 1 with the upper wall portion 51 thereof.

After the cover member 50 is disposed at the midway position, the controller 80 gives an open instruction to the hot-water supply valve 21 to open the hot-water supply valve 21. Accordingly, hot water from the hot-water tank is fed into the cylinder 30 through the hot-water passage 20. When a period during which the hot-water supply valve 21 is open has reached a predetermined period, the controller 80 gives a close instruction to the hot-water supply valve 21 to close the hot-water supply valve 21. Accordingly, into the cylinder 30, a predetermined amount of hot water has been fed.

Figure 5:
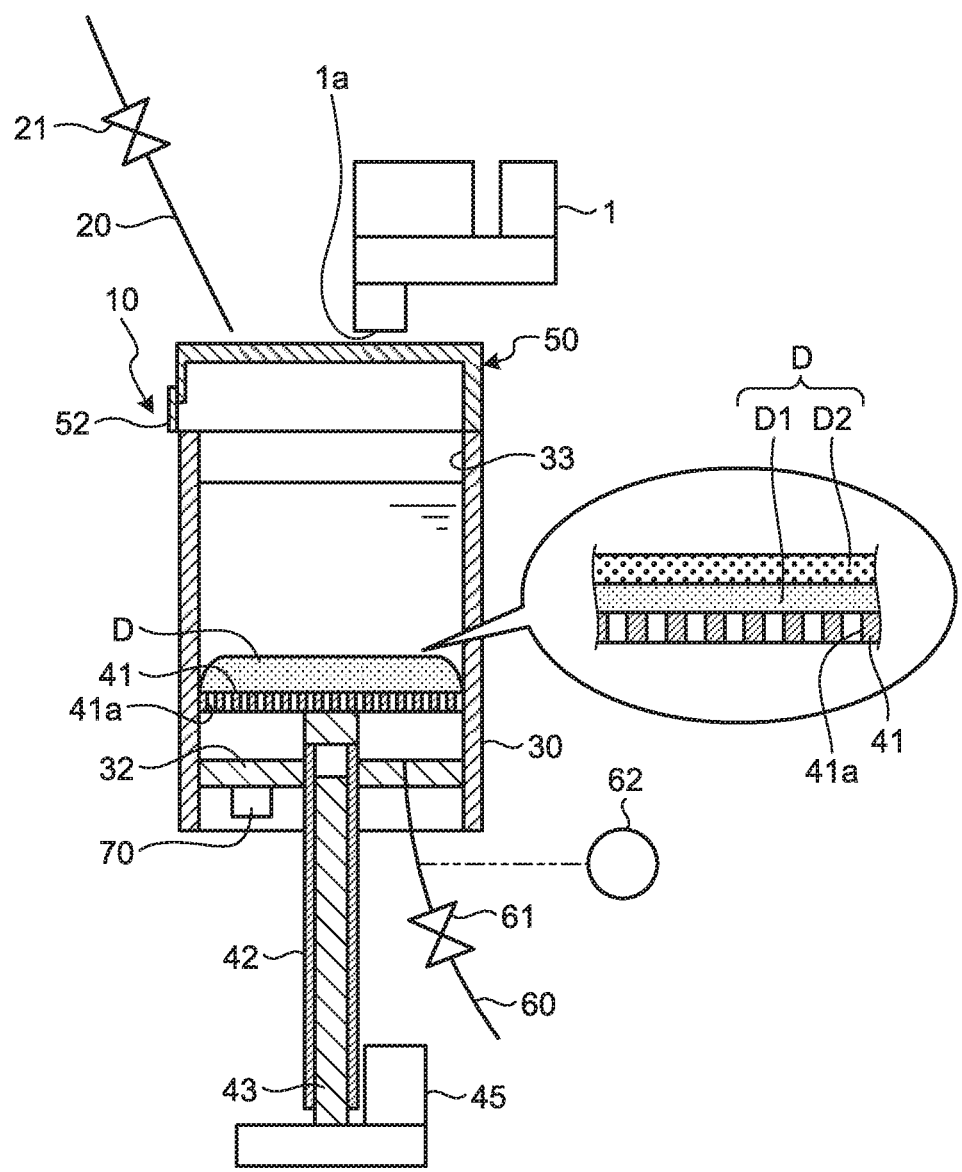
FIG. 5 is another explanatory drawing illustrating the procedure of the beverage extracting operation of the beverage extraction device illustrated in FIG. 1.

As illustrated in FIG. 5, when the predetermined amount of hot water is fed into the cylinder 30, the controller 80 gives a drive instruction to the cover motor M to drive the cover motor M in the reverse rotation direction. Accordingly, the cover member 50 is moved leftward from the midway position to reach the fully closed position.

Subsequently, the controller 80 causes the mesh member 41 to wait at the bottom dead point until a predetermined period has elapsed since the controller gave the drive stop instruction to the piston motor 45.

Thus, coffee raw material obtained after stirring coffee raw material and hot water precipitates to form a deposit D on the upper surface of the mesh member 41. As illustrated in an enlarged view in FIG. 5, fine-powder coffee raw material (hereinafter, also called "fine-powder raw material") D1 precipitates on the upper surface of the mesh member 41, and coffee raw material (hereinafter, also called "powder raw material") D2 the diameter of which is greater than that of the fine-powder raw material D1 precipitates on the fine-powder raw material D1.

The controller 80 gives a drive instruction to the piston motor 45 to drive the piston motor 45 in the reverse rotation direction. Accordingly, the feed screw 43 is rotated counterclockwise when viewed from above, whereby the mesh member 41 is moved upward together with the feed nut 42.

Figure 6:
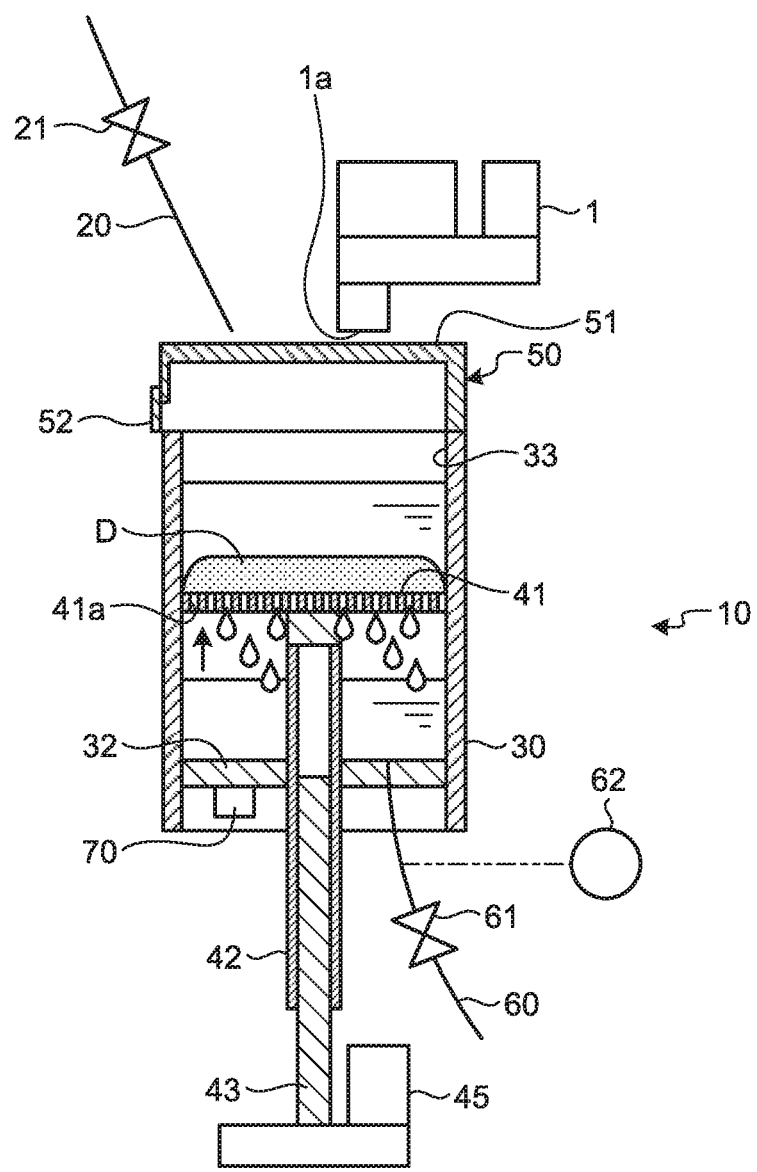
FIG. 6 is another explanatory drawing illustrating the procedure of the beverage extracting operation of the beverage extraction device illustrated in FIG. 1.

As illustrated in FIG. 6, when the mesh member 41 is moved upward in this manner, a liquid obtained by stirring the coffee raw material and the hot water passes through the through holes 41a, whereby a coffee beverage can be extracted below the mesh member 41.

In this case, the stirred liquid passes through the deposit on the mesh member 41, and thus the extracted coffee beverage is filtered. Preferably, the controller 80 performs Pulse-Width Modulation (PWM) control on the piston motor 45 such that a pressure value (pressure result) given from the pressure sensor 62 is a predetermined pressure value set in advance.

Subsequently, the controller 80 gives a drive instruction to the cover motor M to drive the cover motor M in the normal rotation direction. Accordingly, the cover member 50 is moved rightward from the fully closed position. When the cover member 50 has been moved to the fully opened position, the controller 80 gives a drive stop instruction to the cover motor M. Consequently, the cover member 50 is disposed at the fully opened position.

Figure 7:
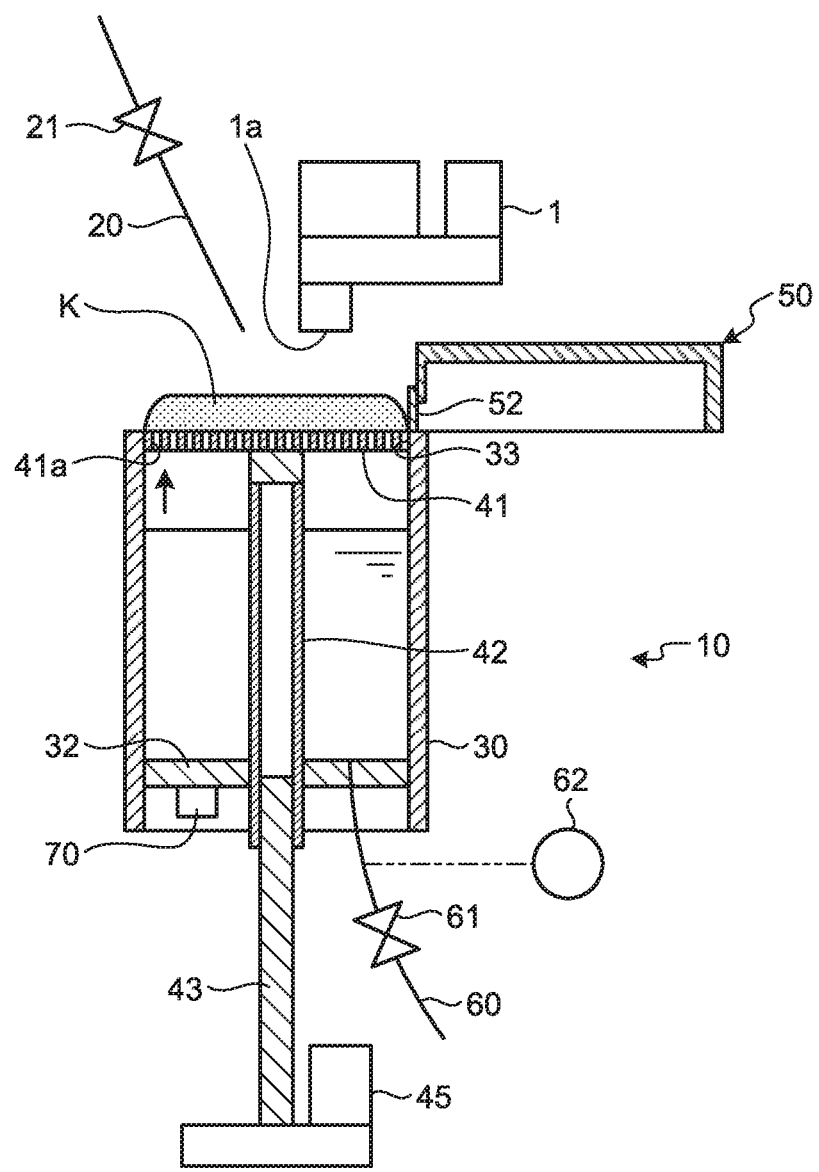
FIG. 7 is another explanatory drawing illustrating the procedure of the beverage extracting operation of the beverage extraction device illustrated in FIG. 1.

Subsequently, as illustrated in FIG. 7, when the mesh member 41 has been moved to the top dead point, the controller 80 gives a drive stop instruction to the piston motor 45. At this time, on the upper surface of the mesh member 41, extraction residue K is placed.

Figure 8:
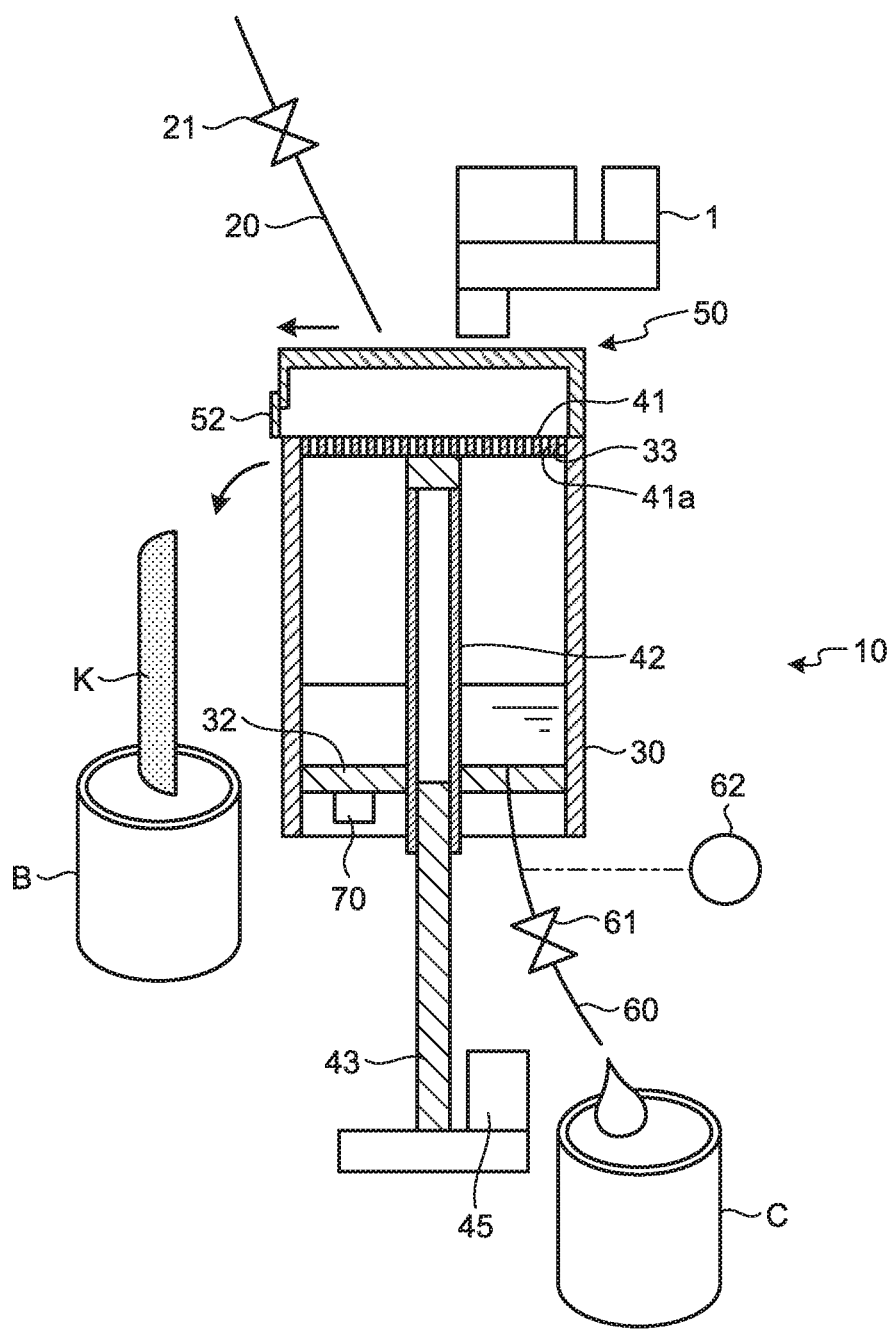
FIG. 8 is an explanatory drawing illustrating the procedure of the beverage extracting operation of the beverage extraction device illustrated in FIG. 1.

Subsequently, the controller 80 gives a drive instruction to the cover motor M to drive the cover motor M in the reverse rotation direction. Accordingly, the cover member 50 is moved leftward from the fully opened position. In this case, the scraper portion 52 of the cover member 50 comes into sliding contact with the upper surface of the mesh member 41 at the top dead point, thereby scraping the extraction residue K placed on the upper surface of the mesh member 41. Consequently, as illustrated in FIG. 8, the extraction residue K can be collected in a residue receptacle B disposed on the left side of the cylinder 30. When the cover member 50 has been moved to the fully closed position in this manner, the controller 80 gives a drive stop instruction to the cover motor M.

The controller 80 gives an open instruction to the extraction valve 61 at the same time when giving the drive instruction to the cover motor M. Accordingly, the extraction valve 61 is opened, and thus the coffee beverage stored in the cylinder 30 is discharged into the beverage container C through the extraction passage 60.

A predetermined amount of coffee beverage is discharged into the beverage container C in this manner, whereby the coffee beverage is provided to a user.

After the coffee beverage has been discharged in this manner, the controller 80 gives a close instruction to the extraction valve 61, and also gives a drive instruction to the cover motor M to drive the cover motor M in the normal rotation direction. Accordingly, the cover member 50 is disposed at the fully opened position, and the operation state returns to the standby state described above.

The following describes a cleaning operation of the beverage extraction device 10. Unlike the extracting operation, this cleaning operation is not performed every time when a product is sold, and is performed at a specified time or at predetermined time intervals when a cleaning instruction is given to the controller 80.

In the standby state illustrated in FIG. 2, when the cleaning instruction is given, the controller 80 gives a drive instruction to the piston motor 45 to drive the piston motor 45 in the normal rotation direction. Accordingly, the feed screw 43 is rotated clockwise when viewed from above, whereby the mesh member 41 is moved downward together with the feed nut 42.

When the mesh member 41 has been moved to an intermediate position separated apart from the bottom portion 32 and the upper-surface opening 33, the controller 80 gives a drive stop instruction to the piston motor 45.

Figure 9:
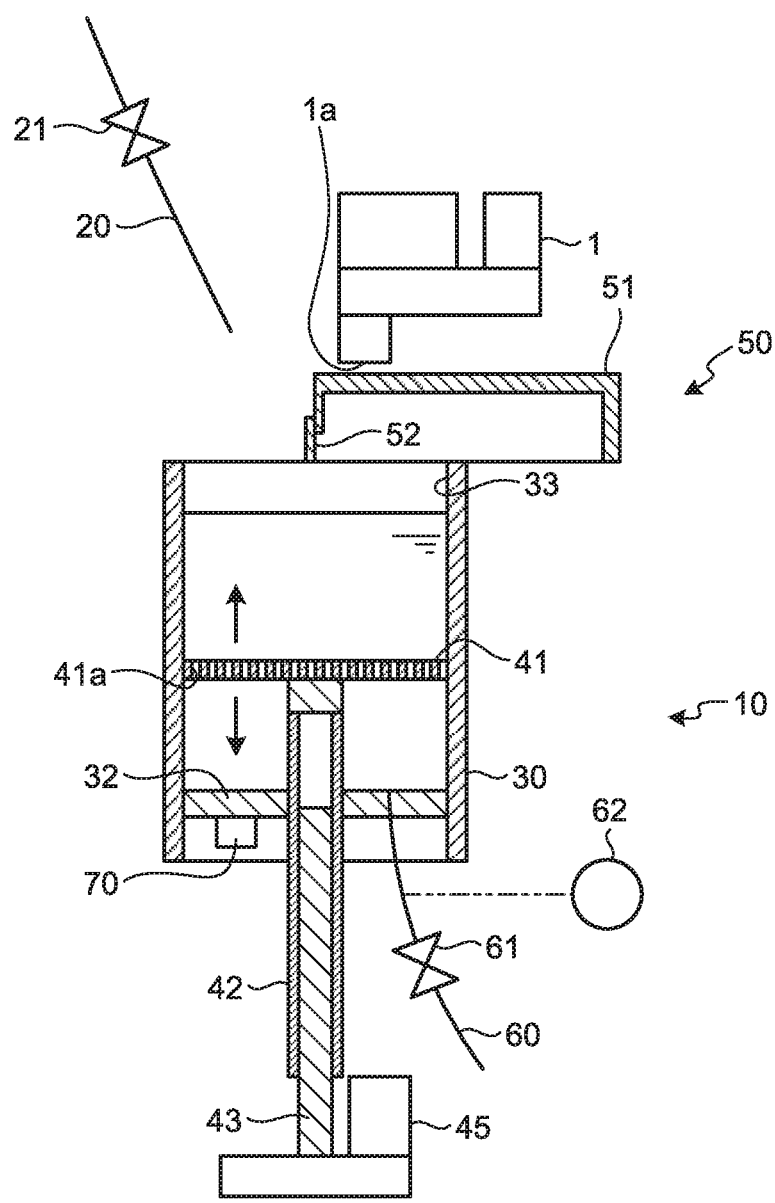
FIG. 9 is an explanatory drawing illustrating cleaning operation of the beverage extraction device illustrated in FIG. 1.

Consequently, the mesh member 41 is disposed at the intermediate position as illustrated in FIG. 9.

The controller 80 also gives a drive instruction to the cover motor M to drive the cover motor M in the reverse rotation direction, whereby the cover member 50 is moved from the fully opened position to the midway position.

After the cover member 50 is disposed at the midway position, the controller 80 gives an open instruction to the hot-water supply valve 21 to open the hot-water supply valve 21. Accordingly, hot water from the hot-water tank is fed into the cylinder 30 through the hot-water passage 20. When a period during which the hot-water supply valve 21 is open has reached a predetermined period, the controller 80 gives a close instruction to the hot-water supply valve 21 to close the hot-water supply valve 21. Accordingly, into the cylinder 30, a predetermined amount of hot water is fed.

After the predetermined amount of hot water is fed into the cylinder 30 in this manner, the controller 80 gives a drive instruction to the piston motor 45 to drive the piston motor 45 in the normal rotation direction and the reverse rotation direction for a predetermined period. Accordingly, the mesh member 41 is moved up and down for the predetermined period, whereby air remaining at a lower portion of the mesh member 41, produced by the feeding of hot water, is removed outside. By this removing of air, ultrasonic waves can be favorably applied by the ultrasonic vibrator 70 as described later.

Subsequently, the controller 80 gives a drive instruction to the ultrasonic vibrator 70. Accordingly, the ultrasonic vibrator 70 is driven to apply ultrasonic waves to the hot water in the cylinder 30.

The controller 80 then gives a drive instruction to the piston motor 45 to drive the piston motor 45 in the reverse rotation direction and the normal rotation direction. Accordingly, the mesh member 41 is moved alternately up and down.

By applying ultrasonic waves to the hot water in this manner, gas molecules of the hot water are compressed and decompressed repeatedly, and the gas molecules then collapse to generate shock waves, thereby producing a cavitation effect of peeling foreign matters sticking to the mesh member 41 and the like from the mesh member 41 and the like. Consequently, the mesh member 41 and the inner surface of the cylinder 30 can be cleaned.

After driving of the ultrasonic vibrator 70 and driving of the piston motor 45 in the reverse rotation direction and the normal rotation direction have been performed for a predetermined period, the controller 80 gives drive stop instructions to the ultrasonic vibrator 70 and the piston motor 45. The controller 80 then gives an open instruction to the extraction valve 61 to discharge the hot water in the cylinder 30 to outside. Subsequently, the controller 80 gives instructions to the piston motor 45, the cover motor M, and the extraction valve 61 to return the operation state to the standby state, and thus the cleaning operation for this time is completed.

As described in the foregoing, with the beverage extraction device 10 according to the embodiment of the present disclosure, when the cleaning instruction is given, the controller 80 drives the ultrasonic vibrator 70 such that ultrasonic waves are applied to hot water, with the hot water being stored in the cylinder 30, and causes the mesh member 41 to move up and down, and thus the mesh member 41 and the inner surface of the cylinder 30 can be cleaned by using the cavitation effect. Consequently, cleaning can be favorably performed without removing the mesh member 41.

The mesh member 41 and the like can be favorably cleaned in this manner, and thus the quality of extracted beverages can be maintained.

With the beverage extraction device 10, because the cylinder 30 is entirely made of metal, the whole cylinder 30 is vibrated by driving the ultrasonic vibrator 70, whereby ultrasonic waves can be applied to all of hot water in the cylinder 30, and the cleaning effect can be improved.

The preferred embodiment of the present disclosure has been described above. However, the present disclosure is not limited to this, and various modifications thereof may be made.

Figure 10:
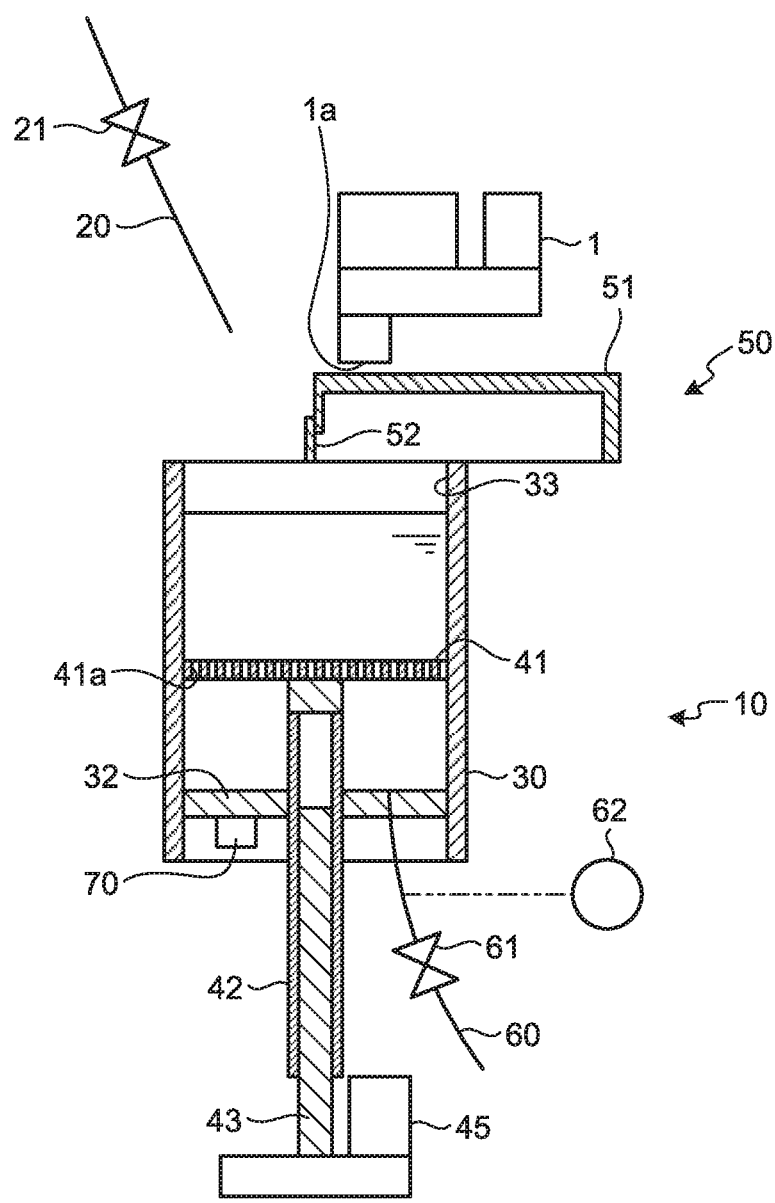
FIG. 10 is an explanatory drawing illustrating another example of the cleaning operation of the beverage extraction device illustrated in FIG. 1.

In the embodiment described above, the mesh member 41 is moved up and down in the cleaning operation. However, in the present disclosure, as illustrated in FIG. 10, the mesh member 41 may be disposed at a predetermined cleaning position, that is, a position where the maximum cavitation effect can be exerted by driving the ultrasonic vibrator 70 to perform the cleaning operation. This cleaning position is determined for each device depending on the shape and the size of the cylinder 30 and the location where the ultrasonic vibrator 70 is attached, for example.

In the embodiment described above, the mesh member 41 is moved up and down in the cleaning operation. However, in the present disclosure, the mesh member may be further rotated about the axis thereof.

In the embodiment described above, the cylinder 30 is entirely made of metal. However, in the present disclosure, only the bottom portion of the cylinder on which the ultrasonic vibrator is provided may be made of metal.

According to an embodiment, when the cleaning instruction is given, the control unit drives the ultrasonic vibrator such that ultrasonic waves are applied to the hot water, with the hot water being stored in the cylinder, and causes the mesh member to move close to and away from the bottom portion. Thus, the mesh member and the inner surface of the cylinder can be cleaned by using a cavitation effect, whereby an effect of enabling favorable cleaning without removing the mesh member is obtained.

According to an embodiment, when the cleaning instruction is given, the control unit causes the mesh member to be disposed at the predetermined cleaning position that is separated by the predetermined distance apart from the bottom portion, with the hot water being stored in the cylinder, and drives the ultrasonic vibrator such that ultrasonic waves are applied to the hot water. Thus, the mesh member and the inner surface of the cylinder can be cleaned by using the cavitation effect, whereby an effect of enabling favorable cleaning without removing the mesh member is obtained.

The invention claimed is:

1. A beverage extraction device comprising:
a cylinder, having a bottomed cylindrical shape, having a lower-surface opening which is closed with a bottom portion thereof, the bottom portion being made of metal;
a mesh member, having a disk shape, having a plurality of through holes formed therethrough, configured to move close to and away from the bottom portion while a side surface of the mesh member is in contact with an inner surface of the cylinder to extract beverage from beverage raw material and hot water, that have been fed through an upper-surface opening of the cylinder, so that the extracted beverage is discharged through an extraction passage connected to the bottom portion;
an ultrasonic vibrator provided on the bottom portion;

a control unit configured to, when a cleaning instruction is given, drive the ultrasonic vibrator in a state where the hot water is stored in the cylinder and the mesh member is dipped in the hot water to apply ultrasonic waves to the hot water, and cause the mesh member to move close to and away from the bottom portion; and a cover member attached to an upper portion of the cylinder so that the cover member is moved among an open position, a partially open position and completely closed position relative to the cylinder, wherein the cover member includes a scraper portion at a side wall of the cover member so that when the mesh member with the beverage raw material on the mesh member is in an upper position, and the cover member is moved from the open position to the closed position, the beverage raw material on the mesh member is scraped.

2. The beverage extraction device according to claim 1, wherein the cylinder is entirely made of metal.

3. A beverage extraction device comprising:

a cylinder, having a bottomed cylindrical shape, having a lower-surface opening which is closed by a bottom portion thereof, the bottom portion being made of metal;

a mesh member, having a disk shape, having a plurality of through holes formed therethrough, configured to move close to and away from the bottom portion while a side surface of the mesh member is in contact with an inner surface of the cylinder to extract beverage from beverage raw material and hot water, that have been fed through an upper-surface opening of the cylinder, so that the extracted beverage is discharged through an extraction passage connected to the bottom portion;

an ultrasonic vibrator provided on the bottom portion;

a control unit configured to, when a cleaning instruction is given, cause the mesh member to be disposed at a predetermined cleaning position that is separated by a predetermined distance from the bottom portion in a state where the hot water is stored in the cylinder and the mesh member is dipped in the hot water, and drive the ultrasonic vibrator to apply ultrasonic waves to the hot water; and a cover member attached to an upper portion of the cylinder so that the cover member is moved among an open position, a partially open position and completely closed position relative to the cylinder, wherein the cover member includes a scraper portion at a side wall of the cover member so that when the mesh member with the beverage raw material on the mesh member is in an upper position, and the cover member is moved from the open position to the closed position, the beverage raw material on the mesh member is scraped.

4. The beverage extraction device according to claim 3, wherein the cylinder is entirely made of metal.

* * * * *